United States Patent [19]
Takagi et al.

[11] Patent Number: 5,409,188
[45] Date of Patent: Apr. 25, 1995

[54] STABILITY COMPENSATING MECHANISM OF ELECTRO-HYDRAULIC SERVO SYSTEM

[75] Inventors: Shigeyuki Takagi, Gifu, Japan; Wataru Takebayashi, Redmond, Wash.

[73] Assignee: Toijin Seiki Co., Ltd., Osaka, Japan

[21] Appl. No.: 12,912

[22] Filed: Feb. 3, 1993

[30] Foreign Application Priority Data
Feb. 12, 1992 [JP] Japan .............................. 4-024189

[51] Int. Cl.$^6$ .......................................... B64C 13/36
[52] U.S. Cl. ............................ 244/195; 244/78; 91/361; 91/365; 91/459
[58] Field of Search ............ 244/78, 195; 91/361, 91/363 R, 363 A, 365, 459

[56] References Cited
U.S. PATENT DOCUMENTS
3,586,264 6/1971 Carter, Jr. et al. ................. 244/78
3,603,534 9/1971 Barltrap ............................. 244/78

*Primary Examiner*—Galen L. Barefoot
*Attorney, Agent, or Firm*—Lane, Aitken & McCann

[57] ABSTRACT

In a stability compensating mechanism of an electro-hydraulic servo system which includes a load-displacement detecting unit for detecting a displacement of a piston of actuator or a displacement of a load connected to the piston, and a control valve for supplying a hadraulic oil to the actuator to drive the load and in which a piston-displacement detection signal of the load-displacement detecting unit is fed as a feedback signal back to a forward circuit and the control valve is operated by a deviation signal between the feedback signal and a command signal, the stability compensating mechanism comprising a valve-displacement detecting unit for detecting a valve displacement of the control valve and outputting a valve-displacement detection signal representative of the valve displacement, and a load-pressure computing unit for computing a load pressure that is acted on the actuator due to the load, on the basis of the piston-displacement detection signal of the load-displacement detecting unit and the valve-displacement detection signal of the valve-displacement detecting unit, and for feeding a load pressure signal representative of the load pressure back to the forward circuit.

2 Claims, 4 Drawing Sheets

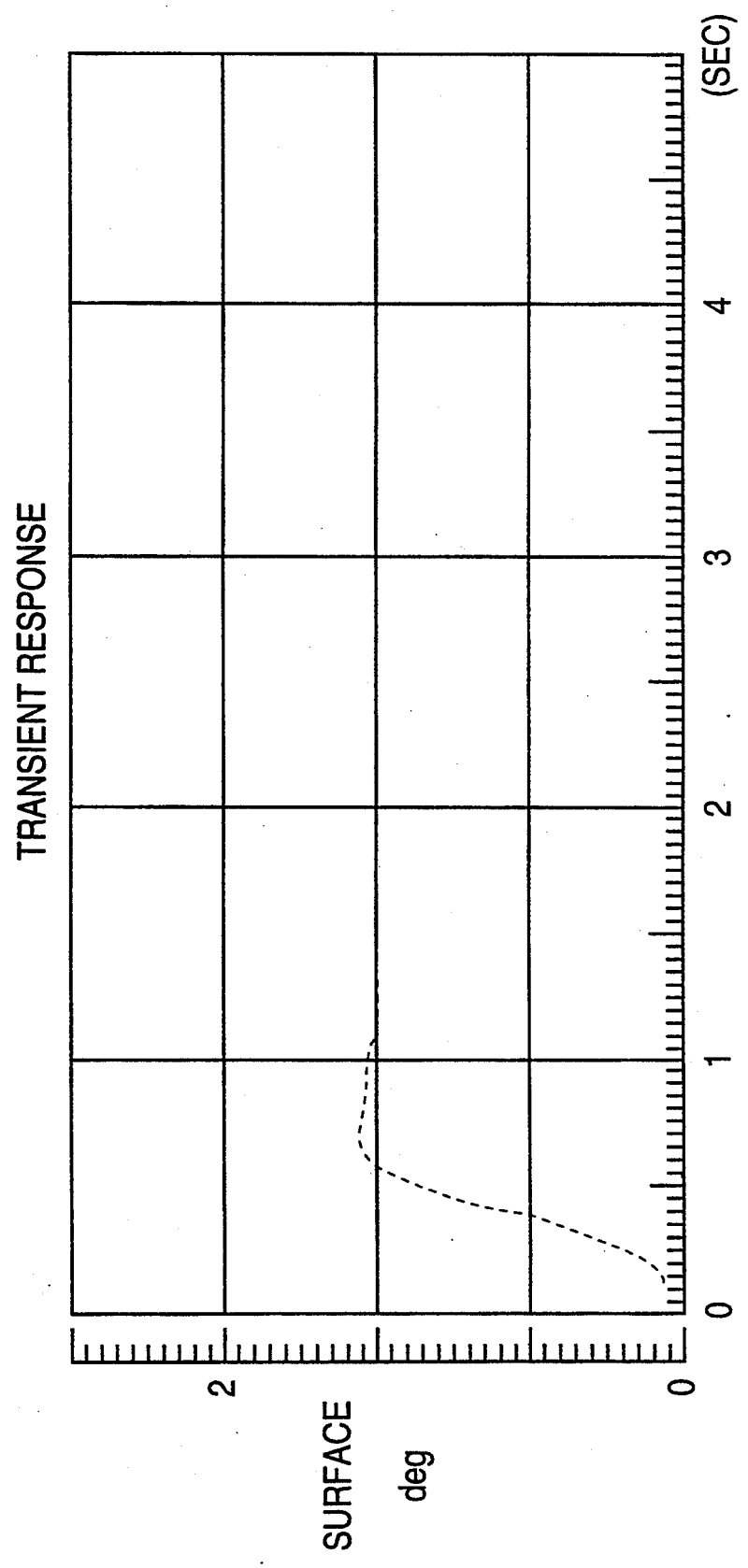

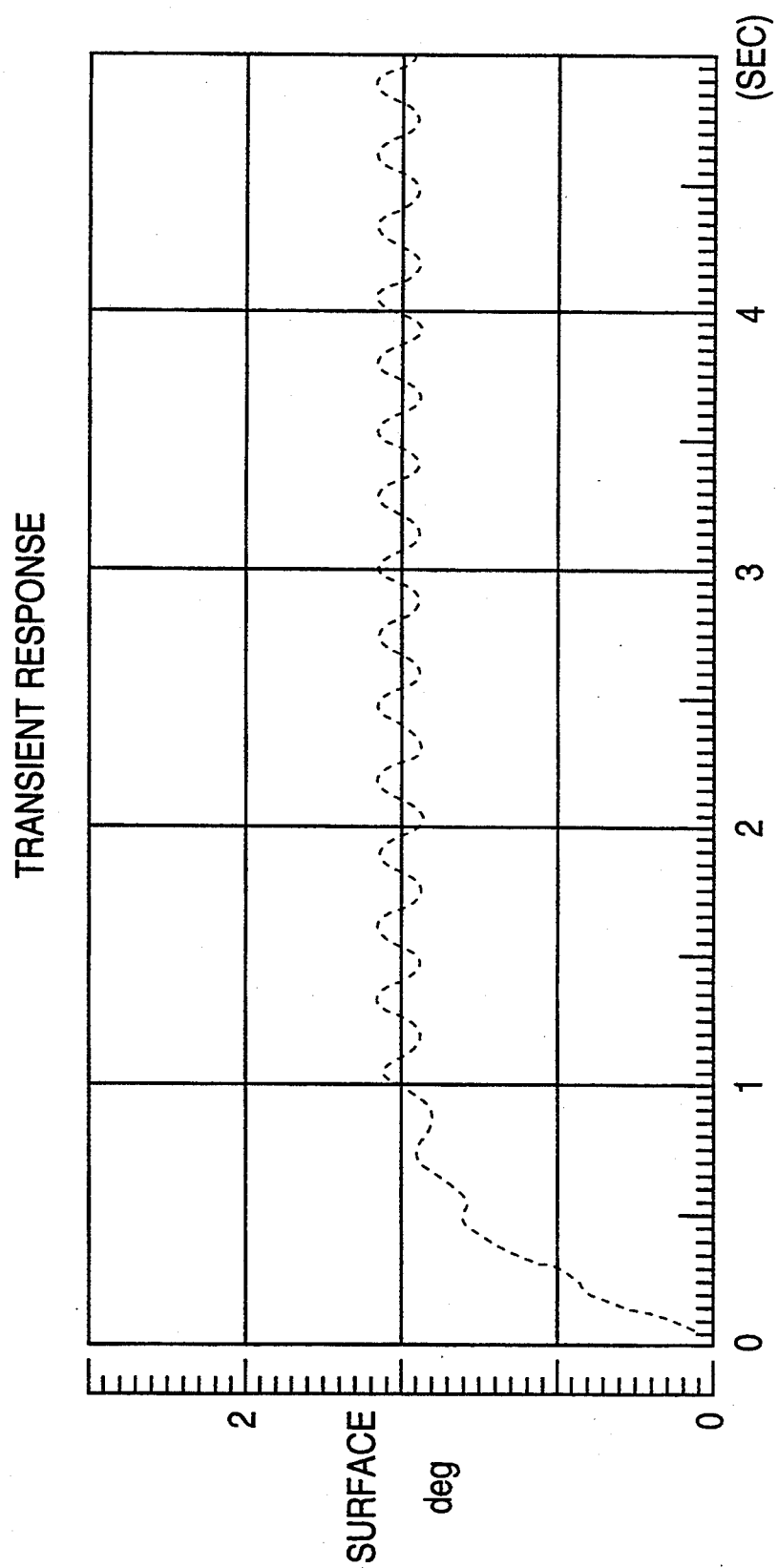

5,409,188

STABILITY COMPENSATING MECHANISM OF ELECTRO-HYDRAULIC SERVO SYSTEM

FIELD OF THE INVENTION

The present invention relates to a stability compensating mechanism that is used in an electro-hydraulic servo system, and more particularly to such a mechanism that is used in a servo system for controlling a control surface of an aircraft.

DESCRIPTION OF THE PRIOR ART

In a digitally-closed discrete electro-hydraulic servo system such as an electro-hydraulic servo system for controlling a control surface of an aircraft, the displacement of a control valve of the surface control actuator is electrically detected, and a discrete control based on the displacement signal and a command signal is performed. Since the system contains a vibrational component (2nd order lag term in differential equation) due to a load such as a control surface and it is not easy to ensure stability when high response is required, a stability compensating mechanism is added within the control loop.

As a stability compensating mechanism of the above kind, there is one using a notch filter. In this stability compensating mechanism, the aforementioned servo system is considered as a dynamics system in which a control surface of an aircraft is a mass, aria a notch filter having an eigenvalue equal to the resonance frequency of the dynamics system is inserted as a compensating element into the control loop of the actuator. With this notch filter, the stability of the system is compensated by canceling out the peak of the aforementioned 2nd order lag term.

However, although, in a conventional stability compensating mechanism such as this, the eigenvalue of the notch filter is constant, the resonance frequency of the servo system tends to vary depending upon changes in flight circumstance such as flight speed and altitude. In addition, the resonance frequency of the servo system can be obtained as an approximate value but not obtained as an accurate value. Therefore, it was difficult to make the eigenvalue of the servo system equal to the resonance frequency of a servo system to be controlled. For this reason, the effect of the stability compensation was insufficient with respect to various flight conditions. In addition, in a case where the notch filter and the servo system are not exactly identical in damping coefficient, the stability compensation effect is also insufficient.

On the other hand, by monitoring fluctuations in a differential pressure between a pair of fluid chambers of a cylinder caused due to load fluctuations by means of a pressure sensor, and by feeding a load pressure signal from this pressure sensor back to a command signal, the stability compensation effect can be enhanced, but the cost is increased.

It is, accordingly, an important object of the present invention to provide a stability compensating mechanism which is inexpensive and capable of effectively compensating the stability of a servo system where only an approximate value of the resonance frequency is known and an accurate value thereof cannot be obtained.

SUMMARY OF THE INVENTION

In a stability compensating mechanism of an electro-hydraulic servo system which includes load-displacement detecting means for detecting a displacement of a piston of actuator or a displacement of a load connected to the piston, and a control valve for supplying a hadraulic oil to the actuator to drive the load and in which a piston-displacement detection signal of the load-displacement detecting means is fed as a feedback signal back to a forward circuit and the control valve is operated by a deviation signal between the feedback signal and a command signal, the stability compensating mechanism comprises valve-displacement detecting means for detecting a valve displacement of the control valve and outputting a valve-displacement detection signal representative of the valve displacement. The stability compensating mechanism further comprises load-pressure computing means for computing a load pressure that is acted on the actuator due to the load, on the basis of the piston-displacement detection signal of the load-displacement detecting means and the valve-displacement detection signal of the valve-displacement detecting means, and for feeding a load pressure signal representative of the load pressure back to the forward circuit. The load may comprise a control surface of an aircraft.

In the present invention, a load pressure that is acted on the actuator due to the load is calculated on the basis of the piston-displacement detection signal of the load-displacement detecting means and the valve-displacement detection signal of the valve-displacement detecting means. A load pressure signal representative of the load pressure is fed back to the forward circuit. Therefore, since the load pressure signal can be fed back without an additional pressure sensor, a stability compensating mechanism which is inexpensive and has a good stability compensation effect can be provided in accordance with the present invention.

BRIEF DESCRIPTION OF THE DRAWINGS

The above and ocher objects and advantages will become apparent from the following detailed description when read in conjunction with the accompanying drawings wherein:

FIG. 3 is a graph showing a transient response characteristic of the embodiment; and FIG. 4 is a graph showing a transient response characteristic of a comparative example.

DESCRIPTION OF THE PREFERRED EMBODIMENTS

Figure 1:
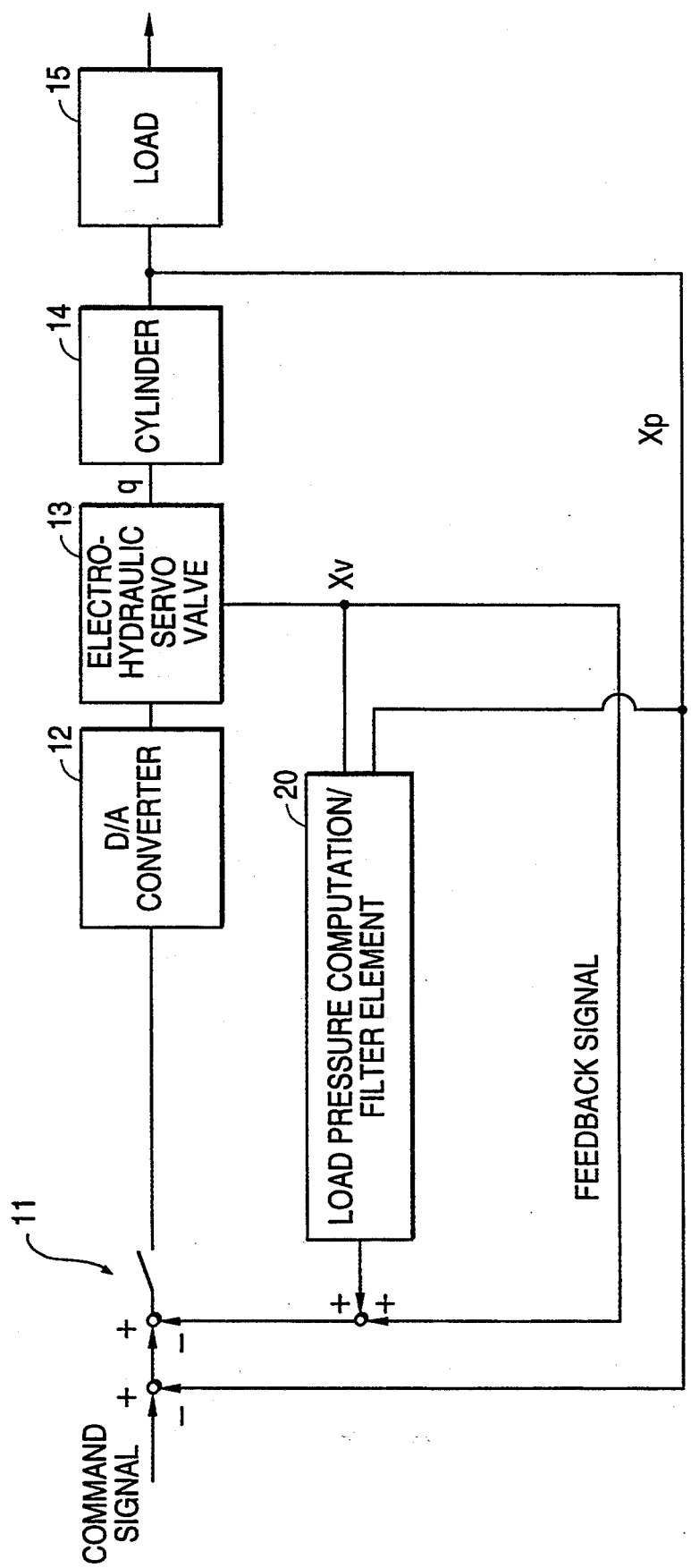
FIG. 1 is a block diagram showing an embodiment of a stability compensating mechanism of an electro-hydraulic servo system according to the present invention.

Referring to FIG. 1, there is shown an embodiment of a stability compensating mechanism of an electro-hydraulic servo system in accordance with the present invention. Reference numeral 11 denotes a sampler, which samples a deviation signal between a command signal and a feedback signal at every predetermined sampling period. The sampled data is converted into an analog signal by a digital-analog converter 12, and the analog signal is fed to a known electro-hydraulic servo valve 13 (control valve). This electro-hydraulic servo valve 13 comprises a spool (valve body), a pair of cylinder ports communicated with a pair of oil chambers of a hydraulic cylinder 14 (actuator), a supply port communicated with a source of oil pressure, and a return port communicated with a tank, these components of the servo valve 13 being not shown. The hydraulic cylinder 14 is driven by a hadraulic oil supplied from the electro-hydraulic servo valve 13 so that a load 15 connected to a piston (not shown) of the hydraulic cylinder 14 can be controlled. The load 15, for example, comprises a control surface of an aircraft.

In FIG. 1, reference character q represents an amount of the hadraulic oil that is supplied from the electro-hydraulic servo valve 13 to the hydraulic cylinder 14. Reference character Xv represents an output signal of a differential transformer or digital displacement gauge (not shown) that detects a stroke (valve displacement) of the spool of the electro-hydraulic servo valve 13. The differential transformer or digital displacement gauge constitutes valve-displacement detecting means. Reference character Xp is an output signal of a differential transformer or digital displacement gauge (load-displacement detecting means) that detects a displacement of the piston (load driving part) of the hydraulic cylinder 14. These output signals Xv and Xp are fed as displacement signals back to a forward circuit (command signal side circuit) and also inputted to a load pressure computation/filter element 20.

Figure 2:
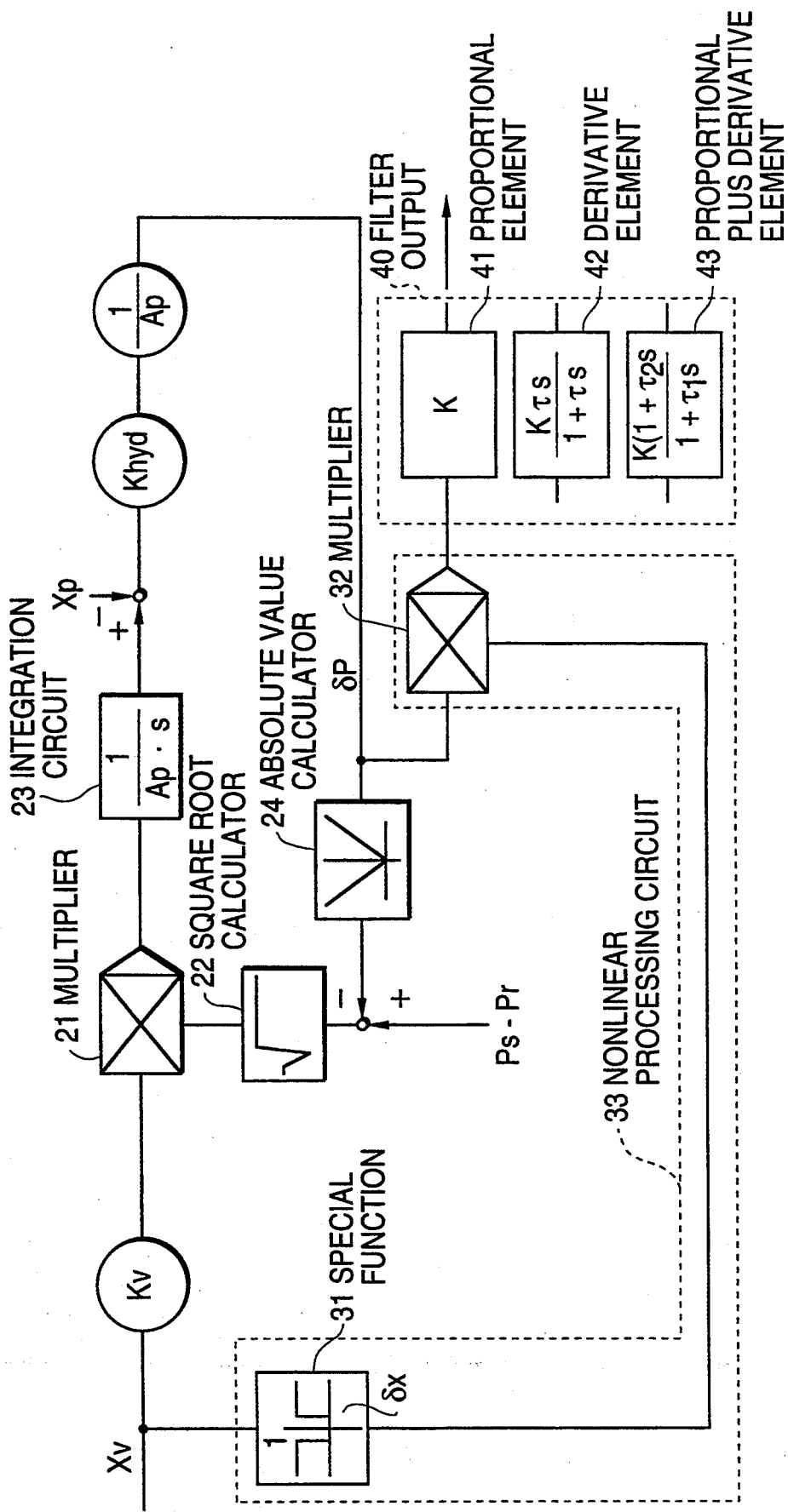
FIG. 2 is a block diagram showing the load-pressure computing means of the embodiment.

The load pressure computation/filter element 20 is load-pressure computing means for computing a solution of the analysis model shown in FIG. 2 and for obtaining a load pressure signal $\delta P$. The result of the computation obtained by the load-pressure computing means is added to the output signal Xv of the aforementioned valve-displacement detecting means through a proportional or derivative element to be described hereinafter and through a first-order lag or first-order lead element to be described hereinafter, and is then fed back to the forward circuit (command signal side circuit). In FIG. 2, the valve displacement signal Xv multiplied by a valve flow gain Kv of the electro-hydraulic servo valve 13 is inputted to a multiplier 21, which also receives a computation output equivalent to an effective pressure from a square root calculator 22. The multiplier 21 then outputs a signal corresponding to a valve flow rate to the integration circuit 23. Based on the valve flow rate inputted from the multiplier 21 and a piston effective area Ap, the integration circuit 23 calculates an ideal piston displacement signal at a condition in which no load is acted on the piston. Next, a deviation between the ideal piston displacement signal and the actual piston displacement signal Xp is obtained, and a signal representative of the deviation is multiplied by a hadraulic fuild stiffness Khyd. The value obtained is divided by the piston effective area Ap to produce the load pressure signal $\delta P$. This load pressure signal $\delta P$ is fed back to a system effective signal (supply pressure Pr - back pressure Pr) through an absolute value calculator 24 to calculate an effective pressure, and the calculated effective pressure is inputted to the square root calculator 22.

On the other hand, the valve displacement signal Xv is also inputted to the multiplier 32 through a special function 31 in which the output thereof becomes zero within a predetermined range of micro flow rate $\delta x$. Based on the signal from the special function 31, the multiplier 32 regulates the load pressure signal $\delta P$ within the micro flow rate range $\delta x$ to form a dead band of output. That is, the special function 31 and the multiplier as a whole constitute a nonlinear processing circuit 33 for performing a nonlinear process with respect to the load pressure signal output.

A filter 40 comprises a proportional element 41, a derivative element 42 and a proportional plus derivative element 43, which are selectable. This filter 40 constitutes the output part of the load pressure calculation/filter element 20. It is noted that reference character s is an differential operator.

In the stability compensating mechanism of the present invention as constructed above, the load pressure is calculated by the use of the piston displacement signal Xp and the valve displacement signal Xv, and the calculated signal is added to the valve displacement signal Xv and fed back to the side of the command signal. Accordingly, unlike the prior art, without monitoring a differential pressure between the oil chambers of the cylinder by means of a pressure sensor, an accurate load pressure signal is fed back to the command signal side by software, so that an optimum control can be performed depending upon load fluctuations and control accuracy considerably enhanced. Therefore, even in a servo system wherein only an approximate value of a resonance frequency is known, a sufficient stability compensation effect can be obtained by an inexpensive stability compensating mechanism having no load pressure sensor ($\delta P$ sensor) circuit, and an electro-hydraulic servo system having a good response characteristic can be provided.

FIG. 3 shows a transient response characteristic of the electro-hydraulic servo system according to the embodiment of the invention, and FIG. 4 shows a transient response characteristic of a comparative example without the stability compensating mechanism of the present invention. It will be understood from these figures that a sufficient stability compensation effect is obtained in the embodiment of the present invention.

While the subjection invention has been described with relation to the preferred embodiment, various modifications and adaptations thereof will now be apparent to those skilled in the art. All such modifications and adaptations as fall within the scope of the appended claims are intended to be covered thereby.

What we claim is:

1. In a stability compensating mechanism of an electro-hydraulic servo system which includes load-displacement detecting means for detecting a displacement of a piston of actuator or a displacement of a load connected to the piston, and a control valve or supplying a hydraulic coil to the actuator to drive the load and in which a piston-displacement detection signal of the load-displacement detecting means is fed as a feedback signal back to a forward circuit and the control valve is operated by a deviation signal between the feedback signal and a command signal, said stability compensating mechanism comprising:

valve-displacement detecting means for detecting a valve displacement of said control valve and outputting a valve-displacement detection signal representative of said valve displacement to be fed back to said forward circuit; and load-pressure computing means for calculating an ideal piston displacement at a condition in which no load is acted on said piston and a deviation between the ideal piston displacement and the actual piston displacement on the basis of said piston-displacement detection signal of the load-displacement detecting means and said valve-displacement detecting signal of said valve-displacement detecting man to compute a value proportional to the deviation between the ideal piston displacement and the actual piston displacement as the value of a load pressure that is acted on said actuator due to said load, and for adding a signal corresponding to the value of said load pressure to the valve-displacement detection signal fed back to said forward circuit.

2. A stability compensating mechanism as set forth in claim 1, wherein said load comprises a control surface of an aircraft.

* * * * *